United States Patent
Pradhan et al.

(10) Patent No.: US 6,177,374 B1
(45) Date of Patent: Jan. 23, 2001

(54) CATALYST COMPRISING OXIDES OF SILICON, ZINC AND ALUMINIUM USED FOR THE PREPARATION OF LPG AND HIGH OCTANE AROMATICS AND A PROCESS FOR PREPARING THE SAME

(75) Inventors: Ajit Ramchandra Pradhan; Nagabhatla Viswanadham; Surendranath Suresh; Nirmalya Ray; Uma Shanker; Turaga Sundara Rama Prasada Rao, all of Dehradun (IN)

(73) Assignee: Council of Scientific & Industrial Research, New Delhi (IN)

( * ) Notice: Under 35 U.S.C. 154(b), the term of this patent shall be extended for 0 days.

(21) Appl. No.: 08/784,150

(22) Filed: Jan. 17, 1997

(51) Int. Cl.[7] .................................................. B01J 29/06
(52) U.S. Cl. .............................. 502/64; 502/71; 502/77; 423/705; 423/713; 423/DIG. 22
(58) Field of Search .................................. 502/64, 71, 77; 423/705, 713, DIG. 22

(56) References Cited

U.S. PATENT DOCUMENTS

| | | |
|---|---|---|
| 3,702,886 | 11/1972 | Arganer et al. . |
| 3,941,871 * | 3/1976 | Dwyer et al. ......................... 423/326 |
| 4,329,328 * | 5/1982 | McAnespie et al. ................. 423/333 |
| 4,563,480 * | 1/1986 | Baacke et al. ........................ 518/728 |
| 4,705,907 * | 11/1987 | Inui ...................................... 585/415 |
| 5,026,938 | 6/1991 | Shum . |
| 5,124,417 | 6/1992 | Omar Farooq . |
| 5,151,259 * | 9/1992 | Blom ...................................... 502/77 |

FOREIGN PATENT DOCUMENTS

| | | | |
|---|---|---|---|
| 1092141 * | 5/1984 | (SU) ..................................... 423/713 |

OTHER PUBLICATIONS

Ball et al.; Procedings of the 7th International Zeolite Conference, "Studies in Surface Science and Catalysis"; No. 28; pp. 951–956; "Zinc and Aluminum Substitutions in MFI–Structures; Synthesis, Characterisations and Catalysis", 1986.*

"Isomolphic Substitutions in Zeolites: Its Potential Catalytic Implications" Tielen et al. Procedings of the Intl. Symposium on Zeolite Catalysis May 13–16, 1985.*

Silicalite, a new hydrophobic crystalline silica molecular sieve by E.M. Flanigen, Nature, vol. 271 (1978), pp. 512–516.

M2 Forming—A Process for Aromatization of Light Hydrocarbons by Nai Y. Chen, Ind. Eng. Chem. Process Design, Dev. vol. 25 (1986) pp. 151–155.

Make aromatics from LPG by P.C. Doolan, et al., Hydrocarbon Processing, Sep. (1989), pp. 72–76.

* cited by examiner

Primary Examiner—Tom Dunn
(74) Attorney, Agent, or Firm—Morgan & Finnegan LLP

(57) ABSTRACT

This invention relates to a novel porous crystalline synthetic catalyst having the general formula expressed in the form of oxides: M 2/n o. x $Al_2O_3$ Y $SiO_2$, Z ZnO wherein, M represents a proton and/or a metallic cation, n is the valence of the said cation, Y/x is a number ranging from 5 to 1000 ($SiO_2/Al_2O_S$ molar ratio), and a process for preparing such catalyst by (a) forming a reaction medium comprising water, a silicon source, an aluminium source, a zinc source and a source of structure directing agent capable of providing organic cations, (b) heating the said reaction mixture to a temperature ranging from 80° C. to 230° C. at autogeneous phase, and (c) heating the solid content obtained at the end of step (b) to a temperature greater than 400° C., so as to eliminate the organic species present due to the use of the structuring agent.

13 Claims, No Drawings

CATALYST COMPRISING OXIDES OF SILICON, ZINC AND ALUMINIUM USED FOR THE PREPARATION OF LPG AND HIGH OCTANE AROMATICS AND A PROCESS FOR PREPARING THE SAME

FIELD OF THE INVENTION

The present invention relates to a novel porous crystalline synthetic material comprising oxides of silicon, zinc and aluminium useful as a catalyst for the preparation of liquified petroleum gas (LPG) and high octane aromatics and a process for the preparation of such catalyst.

The catalyst material prepared by the process of the present invention is given the name zinc-aluminosilicate or Zn—ZSM-5 molecular sieve catalyst. Hence, more specifically, the present invention relates to a process for the preparation of a catalyst consisting of Zn—ZSM-5 which is useful for the preparation of LPG and high octane aromatic hydrocarbons such as benzene, toluene, ethyl benzene and xylenes (BTX) from low value, low octane petroleum feed stocks.

BACKGROUND OF THE INVENTION

New gasoline specifications and changing markets have led to large and rapid variations of feed stocks and availability of the gasoline. The key factor to boost the profitability is to take advantage of these variations and produce high demand, high value products such as LPG, hydrogen and aromatics.

In addition, because of the population, many countries in the world are in a peculiar situation with great demand for LPG, which cannot be met by conventional resources such as cracking processes employing naphtha, gas oil and the like. The deficit between demand and production of LPG at the end of Indian 8 th plan (1996–97) is expected to be 2.8 million metric tones per annum which is likely to increase to 5.8 million metric tones per annum at the end of Indian 9 th plan (2001–02). Similarly, deficit between demand and production of motor gasoline at the end of 9 th plan is expected to be 1.5 million metric tonnes per annum. Hence, good amount of foreign exchange has to be spent for meeting the demand of LPG as the demand cannot be met by indigenous resources.

Natural gas condensate (NGC), aromatic extraction raffinate and light naphtha are considered as some of the few non economically viable feed stocks in the petroleum market today. As these feed stocks are being non-reformable by conventional catalytic reforming process, they have been considered only as a fuel for long periods. These feed stocks can be converted into valuable products like LPG and Benzene, Toluene and Xylenes (BTX aromatics), utilising the shape selective features of medium pore zeolite molecular sieve.

The aromatic hydrocarbons can be used as high octane blending feed stocks for the production of high octane gasoline. They are also used as feed stocks for the preparation of chemical and petrochemical products.

Aromatic chemicals constitute about one third of the total organic compounds known today. They are important chemical precursors for the production of detergents and polymers among others.

Hence, there is a need to develop a versatile process of the preparation of a novel catalyst which will be able to process cheaper, sometimes unwanted and variably available feed stocks to produce LPG and high octane aromatics.

Therefore, the present invention relates to a process for the preparation of a novel catalyst consisting of Zn—ZSM-5 molecular sieve useful for the conversion of petroleum feed stocks into value added products such as LPG and high octane hydrocarbons.

PRIOR ART PUBLICATION

An article published in the literature [Ind. Eng. Chem. Process Design Dev., 25,(1986), 151 ] describes a process proposed by Mobil Research and Development for the preparation of aromatics from variety of feed stocks such as pyrolysis gasoline, unsaturated gases from catalytic cracker, praffinic naphtha and LPG. The process describes the use of purely acidic H—ZSM-5 catalyst. Another report (Hydrocarbon processing, September 1989, p-72) describes a process developed jointly by UOP INC and British Petroleum company, based on gallium doped zeolite catalyst. In this process, LPG was converted into BTX aromatics and the process has been demonstrated in a large scale pilot plant of the British Petioleum's Graigemouth Refinery in Scotland. U.S. Pat. No. 5,124,417 dated June 1992 describes the use of Pt—Sn—ZSM-5 Catalyst for the production of mono alkyl aromatics from $C_8$n-paraffins containing feed stocks. U.S. Pat. No. 5,026,938 dated Jun. 25, 1991 describes a process for converting gaseous feed stocks containing $C_3$–$C_5$ paraffins into aromatic hydrocarbons by contacting the feed with galliosillicate molecular sieve catalyst.

Zeolite ZSM-5 is a crystalline aluminosillicate whose preparation was first claimed in 1972 and is described in a U.S. Pat. No. 3,702,886. Thre frame work structure is well established and the catalyst is reported to have many catalytic applications. "Silicalite" having a similar zeolite structure constituted by pure crystalline $SiO_2$, has been described by E. M. Flanigen [Nature 271(1978), 512]. The highly ordered rigid structure with three dimensional rigid lattice can accommodate $MeO_4$ tetrahedra. Me being for example Al, Fe, Ga, Ti or B.

Conventionally, Benzene, Toluene and Xylenes (BTX) aromatics are obtained by catalytic reforming process of naphtha. In the catalytic reforming process of naphtha, the catalyst used is $Pt/Al_2O_3$ monometallic or $Pt$—$Re/Al_2O_3$ monometallic or $Pt$—$Re/Al_2O_3$ bimetallic catalyst. Although these processes are used all over the world, there are number of limitations in the use of these catalysts for the above mentioned process.

These limitations are:

i) These catalysts are not effective in promoting aromatisation of $C_5$ hydrocarbons. Hence, it can not be used for the aromatisation of feed stocks like natural gas condensate (NGC), light naphtha or aromatic extraction raffinate, which contains appreciable amount of n-pentane and iso-pentane.

ii) These catalysts are also not very effective in promotion of the aromatisation of straight chain paraffins such as n-hexane and n-heptane. Hence, large amount of straight chain paraffins such as n-hexane and n-heptane present in the feed remain uncoveited.

iii) All catalytic reforming units employing these catalysts require an Organic Chloride additive to provide the proper balance between acid and metal function. The Organic Chloride is broken down during reforming process in to hydrochloric acid, a waste product which is difficult to dispose off and targeted for stricter environmental regulations.

iv) These processes result in the formation of gasoline in the range of 75–95 research octane number and hence require use of tetra ethyl lead to boost the octane number. The use of tetra ethyl lead in gasoline has toxic effects of lead emitted from exhausts and is being banned all over the world including India.

SUMMARY AND OBJECTS OF THE INVENTION

The main objective of the present invention relates to a novel porous crystalline synthetic catalyst having the general formula expressed in the form of oxides: wherein M represents a proton and/or a metallic cation, n is the valency of the cation, x, y and z represent the number of moles $Al_2O_3$, $SiO_2$, and ZnO, respectively, Y/x is a number ranging from 5 to 1000 ($SiO_2/Al_2O_3$ molar ratio), and optionally comprising metals such as sodium, potassium, gallium, tin, iron and rhenium.

The preferred catalyst comprising 0.8 wt % of Al (as $Al_2O_3$), 1.7 or 3.3 wt % of Zn (as ZnO) and 97.5 or 95.9 of Si (as $SiO_2$) on anhydrous basis.

Another object of the invention is to provide a process for the production of novel Zn—ZSM-5 Catalyst useful for the production of LPG and high octane aromatic hydrocarbons from non economically viable petroleum feed stocks. The catalyst prepared by the process of the present invention can be used for the production of Benzene, Toluene, Xylenes (BTX) aromatics using feed stocks like natural, as condensate (NGC) and light naphtha. Production of LPG carries significance in view of much demand for LPG in many third world countries.

Zn—ZSM-5 catalyst prepared by the process of the present invention contains Zn, in addition to Al and Si, and possesses MFl structure.

Accordingly, the present invention provides a process for the preparation of a porous cystalline synthetic material constituted by silicon, zinc and aluminium oxides designated as zinc aluminosilicate or Zn—ZSM-5 useful as a catalyst for the preparation of high octane gasoline blending feed stock or more specifically, BTX aromatics and LPG from non-economically viable petroleum feed stocks which comprises of (a) forming a reaction medium comprising water, a silicon source, an aluminium Source, a zinc source and a source of structure directing agent used as gel modifier and void filler capable of providing organic cations, (b) heating the said reaction mixture to a temperature ranging from 80° C. to 230° C., preferably from 140° C. to 210° C., at autogeneous phase, and (c) heating the solid content obtained at the end of step (b) to a temperature in the range of 450–500° C., so as to eliminate the organic species present due to the use of the structuring agent.

The preferred range of temperature employed in step (b) may range from 140° C. to 2 10° C.

Heating the solid obtained at the end of step (b) to a temperature with range of 450–500° C. to finally remove tetra propyl ammonium bromide used as structure directing agent.

The composition of the reaction mixture used in the present invention for the preparation of Zn—ZSM-5 (being expressed in terms of molar reagent ratios) is shown in Table-1.

TABLE 1

| | Molar reagent ratio | Preferably |
|---|---|---|
| $SiO_2/Al_2O_3$ | 5–1000 | 15–100 |
| $SiO_2/ZnO$ | 5–1000 | 15–200 |
| $OH/SiO_2$ | 0.1–1.0 | 0.3–0.6 |
| $H_2O/SiO_2$ | 10–200 | 30–100 |
| $TPA + SiO_2$ | 0.05–2.0 | 0.1–1.0 |
| $Na_2O$ or $K_2O/SiO_2$ | 0.05–2.0 | 0.1–1.0 |

The pH of the reaction medium being between 10 and 12.

Silica in the form of hydrogels, aerogels, colloidal suspension or solution of soluble sillicate such as sodium silicate can be used as a source of silica.

The alumina sources which can be used include aluminium salts (Sulphates, nitrates, chlorides, fluorides and acetate for example), aluminium hydroxide and oxide, aluminates, esters such as tripropyl ester of mono-oitho aluminic acid $[Al(OC_3H_7)3]$.

As zinc source, zinc salts such as zinc sulphate, hydroxide, carbonate preferably nitrate which are capable of being converted into zinc oxide upon calcination, especially in the presence of oxygen can be used.

Instead of starting with separate sources of aluminia and silica, sources in which the two oxides are combined can also be used; for example amorphous alumina, silica gel, crystalline alumino silicate, including clays and zeolites.

The source of structuring agent able to provide organic cations is selected from tetrahydral alkyl ammonium cations such as tetra propylammonium hydroxide or halides such as bromides.

In the present process, preferably, the oxides of alumina and silica are combined and used, such as amorphous alumina, silicagel, crystalline aluuminosilicate, including clays and zeolites.

The acids or acid salts, bases or basic salts possibly added in the reaction mixture in complement to adjust the pH of the reaction medium to the desired value can be choosen from commonly used acids such as hydrochloric acid (HCl), nitric acid ($HNO_3$), Sulphuric acid ($H_2SO_4$), acetic acid ($CH_3COOH$) or acid salts such as sodium hydrogen sulphate ($NaHSO_4$); commonly used bases are such as an ammonium hydroxide ($NH_4OH$), soda (NaOH), Potash (KOH) or commonly used basic salts such as sodium hydrogen carbonate ($NaHCO_3$), or neutral sodium carbonate ($Na_2CO_3$) sodium acetate ($CH_3COONa$), neutral sodium sulphide ($Na_2S$) or sodium hydrogen sulphide (NaHS). Buffer mixtures such as acetic acid ($CH_3COOH$), sodium acetate ($CH_3COONa$), ammonium hydroxide ($NH_4OH$), ammonium chloride can be used for the purpose. The catalyst prepared by the process of the present invention may contain by weight (a) 0.01 to 10% zinc (b))0.5 to 99.99% of a zeolite with an $SiO_2/Al_2O_3$ molar ratio ranging from 15 to 1000; said zeolite molecular sieve having X-ray diffraction pattern shown in Table-2 (c)0.01 to 5.0% by weight of optional metals from the group Na, K, Ca, Pt. Sn and Re (d)0.1 to 99.49% of a matrix chosen from the group consisting of alumina, silica. clay, metal oxides and a combination of the compounds mentioned here in above.

The catalyst preferably containing 0.05 to 5.0% by weight of Zinc, zeolite content varies between 40 to 90% weight. The total preferred metal content of optional metals from the group Na, K, Ca, Pt, Sn and Re varying between 0.05 to 1.0% by weight. The solid matrix may be alumina. The catalyst retains the catalytic activity even after multiple regenerations.

The diffraction pattern of the catalyst have characteristics corresponding to the specifications as presented in Table-2.

TABLE 2

Characterisation of the X-Ray Diffraction spectrum of the zeolite having a MF1 structure according to the invention

| dhk 1(A°) (10$^{-10}$m) | I/Io | dhk 1(A°) (10$^{-10}$m) | I/Io |
|---|---|---|---|
| 11.08–11.26 | S | 3.83–3.89 | VS |
| 9.94–10.20 | MS | 3.80–3.86 | VS |
| 9.68–9.90 | W | 3.74–3.78 | MS |
| 7.40–7.52 | VW | 3.70–3.74 | S |
| 6.30–6.42 | W | 3.63–3.67 | MS |
| 5.95–6.08 | VW | 3.46–3.50 | W |
| 5.54–5.61 | W | 3.33–3.37 | W |
| 4.59–4.64 | VW | 3.29–3.33 | VW |
| 4.34–4.40 | W | 3.03–3.07 | W |
| 4.23–4.29 | W | 2.97–2.99 | W |

VS = Very strong
S = Strong
MS = Medium to strong
M = Medium
MW = Medium to weak
W = Weak
VW = Very weak These zeolite molecular sieves of MF1 structure have the following appropriate chemical formula after calcination, expressed in the form of oxides.

$M_{2/n}O$, x $Al_2O_3$, y $SiO_2$, zZnO wherein,

M represents a proton and/or a metallic cation.

n is the valency of the cation, and x,y and z represents the number of moles $Al_2O_3$, $SiO_2$, ZnO, respectively, and y/x is a number ranging from 5 to 1000 ($SiO_2/Al_2O_3$ molar ratio). y/z is a number ranging from 5 to 1000 ($SiO_2$/ZnO molar ratio). The solid was three times exchanged with 3N $NH_4NO_3$ solution to get the ammonium form of the catalyst. To get the desired protonic form, decomposition was carried out preferably at 450° C. for four hours.

In another embodiment of the present invention, the zinc alumino silicate molecular sieve in the protonated form thus obtained is incorporated in another material (matrix) more resistant to the temperature and other conditions employed in the process. Such matrix material includes synthetic or naturally occuring substances, as well as clays, silica, alumina or metal oxides. The relative portion of the molecular sieve and matrix material on anhydrous basis may vary with molecular sieve content ranging between 10 to 90% by weight.

In yet another embodiment of the present invention, optional metals like sodium, potassium, gallium, platinum, tin, iron, rhenium are advantageously incorporated in to zinc-aluminosilicate molecular sieve either during synthesis or subsequently by impregnation and/or ion exchange. Incorporation of one or more of these optional metals in the molecular sieve is expected to enhance activity, selectivity and life of the catalyst. The total amount of such added metals may vary between 0.1 to 0.5% by weight.

In still another embodiment of the present invention, the catalyst obtained by the process of the present invention is used for the aromatisation reaction of non economically viable petroleum feed stocks which mainly contain paraffins. Such feed stocks include light naphtha, aromatic extraction raffinate, natural gas condensate (NGC) straight run naphtha etc. This reaction is of particular interest as it produces the products of greater value e.g. benzene, toluene, xylenes and LPG from low value feed stocks. Detailed process conditions and possible application of the catalyst prepared by the process of the present invention have been made the subject matter of Indian Patent Application No. 871/DEL/94 filed on Jul. 11, 1994 entitled "An improved process for the preparation of LPG and high octane aromatic hydrocarbons from non-economically viable petroleum stock," incorporated herein by reference.

In another embodiment of the present invention, the catalyst prepared by the process of the present invention shows similar catalytic activity even after seventeen regenerations. As reported in the literature (Catalysis Today, vol. 6, 1989–90, p-35), Zinc exchanged zeolites are active for conversion of methanol into aromatics. But the activity of the catalyst slowly decreases due to elution of zinc from the catalyst under the reducing atmosphere. This phenomenon is well known and is one of the major hurdles in the use of zinc promoted catalyst for practical purposes. But the catalyst used in the present invention does not show such a phenomenon and can be advantageously used even in the reducing atmosphere. Zinc is added in the present process of the invention during the synthesis of zeolite which make it stable under reduced conditions and no such significant loss in activity is observed even after 17 regenerations.

The following examples will serve to illustrate the process of this invention which should not be construed to limit the scope of the present invention.

EXAMPLE 1

This example describes a process for the preparation of zeolite molecular sieve zinc silicalite entering into the composition of the catalyst according to the invention. Silicagel (200–300 mesh) was used as the silica source while zinc nitrate ($Zn(NO_3)_2 \cdot H_2O$) was used as the zinc source.

In a typical procedure. a mixture of NaOH (0.36 moles), $N(C_3H_7)$ Br (0.06 moles), $Zn(NO_3)_2$ (0.007 moles) and water (22.5 moles) were added to the silica gel under stifling. The pH of the reaction gel was controlled by adding 3.5 ml of 1:1 $H_2SO_4$ solution. The crystallization of reaction mixture was carried out at 150° C.for 3 to 5 days. The solid is filtered, washed with hot water and then dried at 80°C., crystallographic analysis shows that the product is a zeolite having a MFI structure where X ray diffraction pattern corresponds to the specification given in Table-2. The chemical analysis of the product reveals that it contains 1.75 wt % Zn as ZnO. The solid prepared as above if desired may be exchanged and/or impregnated with metals from the group Na, Fe, Ca and Pt. The total amount of such metals added is 0.5% by weight.

The solid prepared as above is shaped by extrusion with a binder material or matrix, preferably alumina in a proportion of 65% by weight of zeolite and 35% by weight of binding agent. The paste is obtained by adding water in these two components. This paste is passed through a die having a diameter of 1.4 mm then dried under stream of air at 120° C. and calcined at 550° C. for one hour. The yield of catalyst is 92%.

EXAMPLE 2

This example illustrates a process for the preparation of a zeolite molecular sieve, zinc alumino silicate entering into the composition of the catalyst according to the invention. In this example, aluminium sulphate ($Al_2(SO_4)_3H_2O$) is used as a source of alumina, silica gel (200–330 mesh) was used as the silica source while zinc nitrate ($Zn\ NO_3)_2 \cdot H_2O$) was used as the zinc source.

In a typical procedure, a mixture of $N(C_3H_7)$ Br (0.06 moles), $Zn(NO_3)_2$ (0.007 moles), $Al_2(SO_4)_3 \cdot H_2O$(0.003 moles) and water (22.5 moles) were added to the silica gel (0.6 moles) under stirring. The pH of the reaction gel was controlled by adding 3.5 ml $H_2SO_4$ ($H_2SO_4$: water, 1:1). The crystallisation of reaction mixture was carried out in autoclave at 150° C. for 3 to 5 days.

After crystallization, the solid is filtered, washed with hot water and then dried at 80°C. Crystallographic analysis shows that these zeolites have MFI structure whose X-ray diffraction pattern corresponds to the specification given in Table-2 chemical analysis of the product after calcination in air at 550° C. shows Al (as $Al_2O_3$), 0.8% and Zn (as ZnO), 1.7%.

Protonation of zeolite samples was carried out by submitting the sample to 3 cycles of ion exchange with 0.2 N $NH_4NO_3$ at 80° C. for four hours, followed by filtration and washing with hot water.

The solid prepared as above may be if desired, exchanged/ or impregnated with metals such as Na, Ca, Sn, Pt and Fe to obtain catalyst sample. The total amount of such metals added is 0.5% by weight. The yield of the catalyst is 95%. The solid prepared as above is shaped by extrusion with a binder material or matrix, preferably alumina in a proportion of 65% by weight of zeolite and 35% by weight of binding agent. This paste is obtained by adding water to the above mixture. This paste is passed through a die having a diameter of 1.4 mm, then dried under a stream of air at 120° C. and calcined at 550° C. for one hour.

EXAMPLE 3

This example illustrates a process for the preparation of a zeolite molecular sieve zinc aluminosilicate entering into composition of the catalyst according to the invention. In this example, silica gel (200–300 mesh) was used as the silica source, aluminium sulphate ($Al_2(SO_4)_3H_2O$) as a source of alumina, while ($Zn No_3)_2 \cdot H_2O$) was used as the zinc source.

In a typical procedure, a mixture of $N(C_3H_7)_4$ Br (0.06 moles), $Al_2(SO_4)_3 \cdot H_2O$ (0.003 moles), $Zn(NO_3)_2 H_2O$ (0.015 moles) and water (24 moles) were added to the silica gel (0.6 moles) under stilling. The pH of the reaction gel was controlled by adding 3.5 ml of $H_2SO_4$ ($H_2SO_4$: water, 1:1). The crystallization of reaction mixture was carried out in autoclave at 150° C. for 3 to 5 days.

After crystallisation, the solid is filtered, washed with hot water and then dried at 80°C. Crystallographic analysis shows that the product is a zeolite having a MFI structure. The chemical analysis of the product after calcination in air at 550°C. shows Al (as $Al_2O_3$), 0.8% and Zn (as ZnO), 3.3%.

Protonation of zeolite samples was carried out by submitting the sample to 3 cycles of ion exchange with 0.2 N $NH_4NO_3$ at 80° C. for four hours, followed by filtration and washing with hot water.

The solid prepared as above may be if desired, exchanged or impregnated with metals such as Na, Ca, Sn, Pt and Fe to obtain the catalyst sample. The total amount of such metals added is 0.5% by weight. The yield of the catalyst is 95%. The solid prepared as above is shaped by extrusion with a binder material or matrix, preferably alumina in a proportion of 65% by weight of zeolite and 35% by weight of binding agent. This paste is obtained by adding water to above mixture. This paste is passed though a die having a diameter of 1.4 mm, then dried under a stream of air at 120° C.

EXAMPLE 4

This example shows the catalytic activity of Zinc alumino silicate molecular sieve [Al as $Al_2O_3$), 0.8% and Zn (as ZnO), 1.7%] catalyst [Zn ZSM-5] prepared in Example 2, in fresh form, after six regenerations (after regeneration of the coked catalyst to regain its catalytic activity) and after 17 regenerations for aromatisation reaction. Pure n-heptane was used as a feed for the study and reaction was carried out in a pressure micro reactor unit. The reaction conditions, conversion of n-heptane and selectivity to products are described in Table 3.

TABLE 3

Aromatisation of n-heptane in presence of Zn-ZSM-5.
Reaction conditions:
Temperature: 400° C.
Pressure: 10 Kg/Cm$^{-2}$
LHSV: 2 hr-1
N2/n-heptane: 2

| Catalyst | Fresh | After 6 regenerations | After 17 regenerations |
|---|---|---|---|
| Conversion, Wt % | 91.1 | 90.0 | 89.0 |
| Selectivity, Wt % | | | |
| Methane | 0.3 | 0.6 | 0.2 |
| Ethane + ethylene | 0.3 | 1.1 | 0.8 |
| LPG ($C_3 + C_4$) | 68.0 | 64.0 | 67.2 |
| n-pentane + iso-pentane | 4.7 | 6.9 | 5.2 |
| Aromatics | 26.7 | 27.4 | 26.6 |

The preferred composition of the catalysts after calcination under air at 550°C. on anhydrous basis is described in the following Table 4.

TABLE 4

| Compositions (wt %) | Catalyst 'B' | Catalyst 'C' |
|---|---|---|
| Al (as $Al_2O_3$) | 0.8 | 0.8 |
| Zn (as ZnO) | 1.7 | 3.3 |
| Si (as $SiO_2$) | 97.5 | 95.9 |

The main advantages of the present invention are as follows:

i. The catalyst prepared by the process of present invention is most versatile when used for the conversion of economically non viable petroleum feed stocks into value added products.

ii. Metal zinc which is quite cheap has been used in the catalyst formulation instead of the costly gallium, or platinum which is used in the hitherto known catalysts.

iii. respective of presence of zinc in the catalyst formulation (which has low m.p and b.p.), the catalyst does not show any loss of activity even after multiple use for example seventeen regenerations.

iv. the catalyst prepared by the process of the present invention is not very sensitive to sulfur.

v. The catalyst prepared by the process of the present invention does not require use of corrosive organic chloride additive.

We claim:

1. A process for the preparation of a porous crystalline synthetic material comprising silicon, zinc and aluminum oxides designated as Zn—ZSM-5 in which Zn forms part of a crystalline framework of the material, the material being useful as a catalyst for the preparation of high octane gasoline blending feed stock, BTX aromatics and LPG from a feed stock that is non-reformable by conventional means, the feed stock being selected from the group of: natural gas condensate, aromatic extraction raffinate and light naphtha, the process comprising:

(a) forming a reaction medium comprising water, a silicon source, an aluminum source, a water-soluble zinc source and a source of structure directing agent capable of providing organic cations, wherein the source of zinc used is selected from zinc salts which are capable of being converted into zinc oxide upon calcination, and wherein the zinc salt is $Zn(NO_3)_2$;

(b) heating the reaction mixture to a temperature ranging from 80° C. to 230° C. at autogeneous phase; and (c) heating solid content obtained at the end of step (b) to a temperature greater than 400° C., so as to eliminate the organic species present due to the use of the structuring agent.

2. A process as claimed in claim 1 wherein the catalyst obtained is incorporated into a matrix of synthetic or naturally occurring substances.

3. A process as claimed in claim 2, wherein the matrix is selected from the group consisting of clays, silica, alumina and metal oxides.

4. A process as claimed in claim 2 wherein the relative proportion of the catalyst and the matrix on anhydrous basis vary between 10–90% by weight.

5. A process as claimed in claim 1 wherein said catalyst has a MF1 structure and exhibits the following X-ray diffraction spectrum:

| dhk 1 (A°) (10-$^{10}$m) | I/Io | dhk 1 (A°) (10-$^{10}$m) | I/Io |
|---|---|---|---|
| 11.08–11.26 | Strong | 3.83–3.89 | Very strong |
| 9.94–10.20 | Medium to strong | 3.80–3.86 | Very strong |
| 9.68–9.90 | Weak | 3.74–3.78 | Medium to strong |
| 7.40–7.52 | Very weak | 3.70–3.74 | Strong |
| 6.30–6.42 | Weak | 3.63–3.68 | Medium to strong |
| 5.95–6.08 | Very weak | 3.46–3.50 | Weak |
| 5.54–5.61 | Weak | 3.33–3.37 | Weak |
| 4.59–4.64 | Very weak | 3.29–3.33 | Very weak |
| 4.34–4.40 | Weak | 3.03–3.07 | Weak |
| 4.23–4.29 | Weak | 2.97–2.99 | Weak. |

6. A process as claimed in claim 1 wherein the heating of the reaction mixture at step (b) is performed between 140° C. to 210° C.

7. A process as claimed in claim 1 wherein the source of silica used is selected from silica in the form of hydrogels, aerogels, colloidal suspensions or solutions of soluble silicates.

8. A process as claimed in claim 1 wherein the source of alumina used in selected from aluminum salts aluminum hydroxide and oxide aluminates, and esters of monorthoaluminic acid.

9. A process as claimed in claim 1, wherein oxides of alumina and silica selected from the group consisting of amorphous alumina, silicagel, crystalline aluuminosilicate, including clays and zeolites, are combined and used.

10. A process as claimed in claim 1 wherein the structuring agent used to provide organic cation is selected from tetrahydral lower alkyl ammonium cations.

11. A process as claimed in claim 1 wherein the pH is adjusted by the use of hydrochloric acid, nitric acid, sulphuric acid, acetic acid, or acid salts.

12. A process as claimed in claim 1 wherein a metal selected from the group consisting of sodium, potassium, gallium, platinum, tin, iron and rhenium is incorporated into the catalyst to enhance the catalyst activity.

13. A process as claimed in claim 1 wherein the total amount of such metals added ranges from 0.1 to 0.5% by weight.

* * * * *